(12) United States Patent
Zidar

(10) Patent No.: US 10,030,706 B2
(45) Date of Patent: Jul. 24, 2018

(54) SLIDING BEARING ELEMENT

(71) Applicant: Miba Gleitlager Austria GmbH, Laakirchen (AT)

(72) Inventor: Jakob Zidar, Altmuenster (AT)

(73) Assignee: Miba Gleitlager Austria GmbH, Laakirchen (AT)

(*) Notice: Subject to any disclaimer, the term of this patent is extended or adjusted under 35 U.S.C. 154(b) by 0 days.

(21) Appl. No.: 15/546,502

(22) PCT Filed: Feb. 19, 2016

(86) PCT No.: PCT/AT2016/050033
§ 371 (c)(1),
(2) Date: Jul. 26, 2017

(87) PCT Pub. No.: WO2016/131074
PCT Pub. Date: Aug. 25, 2016

(65) Prior Publication Data
US 2018/0017107 A1 Jan. 18, 2018

(30) Foreign Application Priority Data
Feb. 19, 2015 (AT) .............................. A 50128/2015

(51) Int. Cl.
*F16C 33/12* (2006.01)
*F16C 17/02* (2006.01)
(Continued)

(52) U.S. Cl.
CPC ............ *F16C 33/121* (2013.01); *C22C 13/00* (2013.01); *C22C 30/00* (2013.01); *F16C 17/02* (2013.01);
(Continued)

(58) Field of Classification Search
CPC ...... F16C 17/02; F16C 33/121; F16C 33/124; F16C 33/125; F16C 33/127;
(Continued)

(56) References Cited

U.S. PATENT DOCUMENTS 3,055,717 A * 9/1961 Schmidt ........................ 428/643
3,077,285 A * 2/1963 Budininkas ................... 384/912
(Continued)

FOREIGN PATENT DOCUMENTS

| AT | 5 056 64 B1 | 3/2009 |
| AT | 509 111 A1 | 6/2011 |

(Continued)

OTHER PUBLICATIONS

International Search Report of PCT/AT2016/050033, dated Jun. 16, 2016.

*Primary Examiner* — Marcus Charles
(74) *Attorney, Agent, or Firm* — Collard & Roe, P.C.

(57) ABSTRACT

The invention relates to a sliding bearing element (1) with a running layer (4) made from a first tin-based alloy and an additional layer (5) made from an additional tin-based alloy, said alloys containing at least one element from a group comprising Cu, Ni, Ag, Sb, As, Pb, Bi, Te, Tl and/or non-metal particles. The first tin-based alloy has a strength index FI of at least 5 and at most 25, and the additional tin-based alloy has a strength index FI of at least 0.3 and at most 3. The strength index of the running layer (4) is at least five times the strength index of the additional layer (5), and the strength index FI is defined by the equation, $$FI = 100 * \omega C + 50 * \omega S + 2 * \sqrt[2]{(100 * \omega B)},$$

(Continued)

in which C represents at least one of the elements Cu, Ni, Ag; S represents Sb and/or non-metal particles; B represents at least one of the elements Pb, Bi, Te, Tl; and ω represents the total content of each of the tin-based alloy components assigned to the letters C, S, and B.

15 Claims, 3 Drawing Sheets

(51) Int. Cl.
  *C22C 13/00* (2006.01)
  *C22C 30/00* (2006.01)
  *F16C 43/02* (2006.01)

(52) U.S. Cl.
  CPC .......... *F16C 33/124* (2013.01); *F16C 33/125* (2013.01); *F16C 33/127* (2013.01); *F16C 43/02* (2013.01); *F16C 17/022* (2013.01); *F16C 2204/34* (2013.01); *F16C 2360/22* (2013.01)

(58) Field of Classification Search
  CPC .............. F16C 2204/34; F16C 2204/12; F16C 2204/06; F16C 2223/70; F16C 43/02; F16C 2204/16; B32B 15/01; C22C 13/00; C22C 30/04; C22C 38/008
  USPC ......... 384/95, 129, 261, 273, 275–276, 282, 384/907, 912; 428/615, 647, 674, 697
  See application file for complete search history.

(56) References Cited

U.S. PATENT DOCUMENTS

| | | | | |
|---|---|---|---|---|
| 2,715,259 A | * | 8/1985 | Mohler | F16C 33/124 |
| | | | | 428/647 |
| 4,553,856 A | * | 11/1985 | Bierlein et al. | F16C 33/28 |
| | | | | 384/294 |
| 5,056,936 A | * | 10/1991 | Mahrus et al. | F16C 9/02 |
| | | | | 384/294 |
| 5,209,578 A | * | 5/1993 | Eastham et al. | F16C 33/24 |
| | | | | 384/276 |
| 5,952,085 A | * | 9/1999 | Rickerby et al. | C23C 14/067 |
| | | | | 428/216 |
| 6,000,853 A | | 12/1999 | Lytwynec et al. | |
| 6,267,508 B1 | * | 7/2001 | Bank et al. | F16C 33/06 |
| | | | | 384/294 |
| 6,301,784 B1 | | 10/2001 | Niegel et al. | |
| 6,321,712 B1 | * | 11/2001 | Havel | F02B 77/00 |
| | | | | 384/288 |
| 6,357,919 B1 | * | 5/2002 | Kawachi et al. | F16C 33/06 |
| | | | | 384/276 |
| 6,492,039 B2 | | 12/2002 | Huhn et al. | |
| 6,575,635 B1 | * | 6/2003 | Tsuji et al. | F16C 33/12 |
| | | | | 384/276 |
| 7,153,591 B2 | * | 12/2006 | Tsuji et al. | F16C 32/00 |
| | | | | 384/913 |
| 7,862,902 B2 | * | 1/2011 | Zidar | F16C 33/12 |
| | | | | 384/913 |
| 8,440,322 B2 | * | 5/2013 | Suga et al. | F16F 33/121 |
| | | | | 384/625 |
| 8,586,513 B2 | | 11/2013 | Zidar | |
| 9,074,627 B2 | | 7/2015 | Zidar | |
| 2004/0202887 A1 | * | 10/2004 | Kawachi et al. | B32B 15/01 |
| | | | | 428/642 |
| 2004/0265618 A1 | | 12/2004 | Tsuji et al. | |
| 2006/0216539 A1 | * | 9/2006 | Takayanagi et al. | B32B 15/01 |
| | | | | 384/912 |
| 2007/0065067 A1 | * | 3/2007 | Garner et al. | F16C 33/201 |
| | | | | 384/907 |
| 2009/0317657 A1 | * | 12/2009 | Knoblauch et al. | B32B 15/013 |
| | | | | 428/647 |
| 2012/0064365 A1 | | 3/2012 | Takayanagi et al. | |
| 2013/0216169 A1 | | 8/2013 | Zidar | |

FOREIGN PATENT DOCUMENTS

| | | | | |
|---|---|---|---|---|
| AT | 509 112 A1 | 6/2011 | | |
| AT | 509 867 B1 | 12/2011 | | |
| DE | 82 06 353 U1 | 5/1983 | | |
| DE | 197 28 777 A1 | 4/1999 | | |
| DE | 199 63 385 C1 | 1/2001 | | |
| DE | 100 54 461 A1 | 5/2001 | | |
| DE | 10 2011 113451 A1 | 4/2012 | | |
| GB | 566 360 A | 12/1944 | | |
| GB | 2270721 A | * | 3/1994 | .............. F16C 33/12 |
| GB | 740157 A | * | 11/1995 | ............. F16C 33/125 |
| GB | 2 375 801 A | 11/2002 | | |
| JP | 05202938 A | * | 8/1993 | .............. F16C 33/12 |
| JP | 2005036819 A | * | 2/2005 | .............. F16C 33/12 |

\* cited by examiner

SLIDING BEARING ELEMENT

CROSS REFERENCE TO RELATED APPLICATIONS

This application is the National Stage of PCT/AT2016/050033 filed on Feb. 19, 2016, which claims priority under 35 U.S.C. § 119 of Austrian Application No. A 50128/2015 filed on Feb. 19, 2015, the disclosure of which is incorporated by reference. The international application under PCT article 21(2) was not published in English.

BACKGROUND OF THE INVENTION

1. Field of the Invention

The invention relates to a sliding bearing element, in particular a radial sliding bearing element, comprising in this sequence on top of one another: a support element, which in particular forms a support layer, at least one running layer, at least one additional layer, and possibly/preferably at least one bearing metal layer between the support element and the at least one running layer, wherein the at least one running layer is formed by at least one first tin-based alloy and the at least one additional layer is formed by at least one additional tin-based alloy, wherein the first tin-based alloy and the additional tin-based alloy contain at least one element from a group comprising Cu, Ni, Ag, Sb, As, Pb, Bi, Te, Tl and/or non-metallic particles, and the at least one first and the at least one additional tin-based alloy contain beta-tin grains.

2. Description of the Related Art

The use of tin-based alloys as so-called running or sliding layers in sliding bearings for the motor industry has been known for a long time, For example, reference is made to this in GB 566 360 A (Sn—Cu alloy with 75% to 99.75% Sn), DE 82 06 353 U1 (white metal with a maximum of 2 wt. % Cu and possibly small amounts of As, Ni, and Cd.), DE 197 28 777 C2 (3 wt. % to 20 wt. % copper, remainder tin), DE 199 63 385 C1 (tin matrix with embedded Sn—Cu particles of 39 wt. % to 55 wt. % Cu and remainder Sn), AT 509 112 A1 and AT 509 111 A1 (tin-based alloy with up to 20 wt. % Sb, up to 10 wt. % Cu and up to in total 1.5 wt. % Pb and Bi, wherein the total amount of Sb and Cu is between 2 wt. % and 22 wt. % and the beta-tin grains have a specific orientation or a specific grain size).

In the prior art also tin or tin alloys are described for forming a so-called tin flash. As described for example in U.S. Pat. No. 6,000,853 A, this relates to a protective layer on sliding bearings which is less than 1 μm thick, which is used as surface protection from oxidation and improves the visual appearance of the sliding surface. The tin flash is removed from the shaft during the initial start-up of the sliding bearing, as it is too soft. An improvement in the running-in behavior can be achieved by the tin flash, the actual running-in layer is however the sliding layer located below the tin flash, which enables the geometric adjustment of the frictional partners. In contrast to this U.S. Pat. No. 6,000,853 A describes a functional layer with a thickness of pure tin of approximately 5 μm. Said functional layer is arranged on a lead-based alloy. In this way on the contact surface a eutectic alloy is formed with a suitably much reduced temperature resistance. Furthermore, the interdiffusion of lead may occur from the direct contact with lead material.

DE100 54 461 C2 describes a multi-layered sliding bearing with a cover layer made from a tin-based alloy with reinforcing metals and/or inorganic particles, wherein the content in a central area with regard to the thickness is relatively high and is zero in the surface area or less than in the center.

Generally, the multi-layered sliding bearings formed by the tin-based alloys are satisfactory for the task they are assigned to fulfil. For some special applications, such as e.g. fast running engines (about 1000 U/min to 3000 U/min), for example lorry engines, gas engines, engines for mining and shipping applications and for medium-speed running engines (about 300 U/min to 1000 U/min), for example in shipping and power station applications, i.e. generally highly loaded radial sliding bearings, surface coatings are used which are reinforced due to the high loading on the radial inner surface. In this case the surface condition prior to coating is generally reflected on the coated surface. Fine bores or clearing grooves create a waviness on the surface in radial or axial direction. Said waviness, in particular in a reinforced surface coating, causes extremely high localized loading at the beginning of operation. Due to the unevenness of the surface the waviness is mainly the groove peaks, mediated by an extremely thin oil film possibly even a peeling off oil film. At the same time the high wearing resistance of reinforced coatings means that the desired adaptation of the bearing surface to the shaft (adjusting wear) occurs too slowly or only to an insufficient extent. In said extended phase of adjusting wear by overloading the surface coating due to the not yet complete support part irreversible damage may be caused in the form of fatigue, tearing and/or breakouts.

SUMMARY OF THE INVENTION

The underlying objective of the present invention is to reduce or avoid localized overloading of the running layer during the running-in phase of a highly loaded radial sliding bearing.

A highly loaded radial sliding bearing is in particular a radial sliding bearing, which is used in fast running and moderately fast running engines (according to the above explanations).

The objective of the invention is achieved with the aforementioned sliding bearing element in that the at least one first tin-based alloy has a strength index FI of at least 5 and at most 25 and the at least one additional tin-based alloy has a strength index FI of at least 0.3 and at most 3, the strength index of the running layer is at least five times the strength index of the at least one additional layer arranged directly on the running layer, wherein the strength index FI is defined by the equation $$FI = 100 * \omega C + 50 * \omega S + 2 * \sqrt[2]{(100 * \omega B)},$$

where C represents at least one of the elements Cu, Ni, Ag, S for Sb and/or As and/or non-metal particles, B at least one of the elements Pb, Bi, Te, Tl, and ω for the total content of the components of the tin-base alloys associated respectively with the letters C, S and B.

It is an advantage here that the less strong cover layer made from the at least one additional tin-based alloy wears rapidly during the running-in. Here however abraded particles are not removed or are not fully removed by the lubricating oil, but due to the greater ductility of said soft layer a levelling of the waviness of the surface of the running layer occurs. The underlying running layer with the higher strength index here supports the at least one further layer. Furthermore, said layer structure has the advantage that after the running-in of the sliding bearing element, in the troughs of the surface of the at least one running layer created by mechanical processing, the at least one additional layer with the lower strength index is at least partially retained. This has an effect on its tribological behavior during the normal operation of the sliding bearing element, in particular with respect to the embeddability of foreign particles or the lubricating behavior of the sliding bearing element. Here by means of the elevations of the waviness of the at least one running layer a support effect is achieved for the at least one additional tin-based alloy in the troughs. Furthermore, the cover layer also improves over a large area the adaptation of the bearing surface to the bearing plugs. This need for adjustment is caused by differences in the surface geometry of plugs, basic bore and bearing shape (e.g. roundness, conicity, alignment of the bodies to one another). Said differences naturally increase with the size of the components. The known "tin-flash" from the prior art cannot satisfy these requirements sufficiently as it abrades rapidly during the running-in phase.

According to one embodiment variant of the sliding bearing element it is possible that the at least one additional layer is also arranged at least on a sliding bearing element rear. Particularly preferably, the at least one additional layer surrounds the remaining layers of the sliding bearing element. It is thus possible in a single method step to provide the sliding bearing element rear and also the radial inner surface of the at least one running layer with the at least one additional tin-based alloy, wherein the at least one further tin-based alloy creates the aforementioned effects on the radial inner surface, but on the sliding bearing element rear can be used at the same time as corrosion protection. By means of the simultaneous deposition on the front and rear side of the sliding bearing element thus a suitable amount of time can be saved during the production of the sliding bearing element. The same applies to the embodiment variant in which the at least one further layer fully surrounds the additional layers so that the at least one additional layer is also deposited on the end faces in axial direction. In this case however the at least one additional layer can also act as an axial sliding surface.

According to a further, preferred embodiment variant of the sliding bearing element it is possible that the at least one additional layer, at least in the region of a radial inner surface, has a layer thickness, which is selected from a range of at least $5*10^{-6}$ of a bearing inner diameter to $50*10^{-6}$ of a bearing inner diameter, wherein the layer thickness of the at least one additional layer is at least 1.5 µm and at most 15 µm. Thus in this embodiment variant when determining the layer thickness of the at least one additional layer within the defined absolute limit values of the bearing inner diameter also the bearing play is taken into account. In connection with the layer structure of the at least two different tin-based alloys in this way it is easier to prevent the removal of the lubricant film, thereby preventing more effectively damage to the sliding bearing element during the running-in phase.

According to further embodiment variants it is possible that the layer thickness of the at least one additional layer is greater in the region of the radial inner surface than twice the arithmetic roughness average value Ra according to DIN EN ISO 4287:2010 of said surface and/or that the layer thickness of the at least one additional layer is smaller in the region of the radial inner surface than twice the average roughness depth Rz according to DIN EN ISO 4287:2010 of this surface. Preferably, the layer thickness of the at least one additional layer is selected so that both conditions apply. On the one hand by taking into account the Ra the negative influences of the more solid running layer below the at least one additional layer during the running-in phase can be reduced further, whereby on the other hand by taking into consideration the Rz the at least one additional layer still has a sufficient support effect from the at least one running layer.

The layer thickness of the at least one additional layer on the sliding bearing element rear can be between 0.1 times and 0.5 times the layer thickness of the at least one additional layer in the region of the radial inner surface. As the sliding bearing element is not supposed to rotate in the bearing seat and the at least one further layer is arranged on the sliding bearing element rear between two hard materials, namely between the supporting layer of the sliding bearing element and the material of the bearing mount, and in addition on the sliding bearing element rear only micromovements are expected between the bearing mount and the sliding bearing element, preferably the layer thickness of the at least one additional layer on the sliding bearing element rear is reduced, as the at least one additional layer on the sliding bearing element rear is not meant to be abraded. By reducing the layer thickness the supporting effect of the supporting layer on the at least one further layer can be obtained more effectively. By means of the at least one additional layer on the sliding bearing element rear it is also possible to provide corrosion protection for the sliding bearing element.

According to a further embodiment variant the layer thickness can be 0.3 times to 5 times, in particular 1 times to 2 times, as great as the average height of the dominant waviness profile WDc according to the measurement process of VDA 2007 "Geometric product specification, surface quality, definitions and parameters of the dominant waviness".

The tin-based alloys of the at least one running layer and the at least one additional layer contain beta-tin grains, as already known. Here it is an advantage if the preferred orientation of the beta-tin grains is largely the same in at least two adjoining layers of the at least one running layer and/or the at least one additional layer, whereby preferably the two adjoining layers are a running layer and an additional further layer. It is particularly preferable if the X-ray diffraction intensity of the further layer with the highest orientation index is also the X-ray diffraction intensity with the highest orientation index of the running layer or one of the three X-ray diffraction intensities of the running layer with the highest orientation indices, or if in particular also the X-ray diffraction intensities with the second and/or third-highest orientation index of the additional layer are the X-ray diffraction intensities with the second and/or third highest orientation index of the running layer. X-ray diffraction intensities with an index of below 1.5, in particular below 2, are ignored here as insufficiently aligned. In this way the bonding strength of the two connected layers can be improved, as at the boundary of the two adjoining layers a kind of toothing effect was observed, in that the grains of one layer fit better into the "gaps" of the other layer.

Preferably, the tin-based alloy of the at least one running layer contains between 0 wt. % and 40 wt. % antimony and/or between 0 wt. % and 25 wt. % copper, whereby the at least one running layer provides on the one hand good embeddability for the foreign particles form the abrasion and on the other hand has suitably high strength.

The tin-based alloy of the at least one additional layer can contain between 0 wt. % and 3 wt. % copper and/or antimony and between 0.01 and 10 wt. % bismuth and/or lead, whereby the at least one further layer can be designed to be more easily deformed. This in turn has a positive effect on the aforementioned levelling effect of the waviness of the at least one running layer with the at least one additional layer during the running-in phase of the sliding bearing element.

It may be possible for the at least one additional layer to have only one grain layer on beta-tin grains, whereby the bonding strength of the at least one additional layer can be improved in the troughs of the waviness of the surface of the at least one running layer.

According to another embodiment variant the beta-tin grains in the at least one additional layer have an average grain size of between 10% and 90% of the layer thickness of the at least one additional layer. By forming the beta-tin grains to have an average grain size within said range the matrix can be designed to be more easily deformed from the beta-tin grains, so that the matrix itself has a low strength index. In this way it is possible to alloy larger amounts of further elements, which increase the strength of the matrix without departing from the range of the strength index of the at least one additional layer, and in this way improve the tribological properties of the at least one additional layer by means of the further alloy elements.

Preferably, the at least one further layer is deposited galvanically, as in this way the formation of a specific grain growth can be controlled more effectively. Furthermore, in this way also the aforementioned at least two-sided, preferably fully enclosing depositing of the at least one additional layer can be achieved more easily.

It is also possible that the at least one further layer is arranged directly on the at least one running layer, whereby the aforementioned effects can be improved with regard to the support part of the sliding bearing element and the shortening of the running-in time and the improved bearing capacity of the sliding bearing element during the running-in time.

BRIEF DESCRIPTION OF THE DRAWINGS

For a better understanding of the invention the latter is explained in more detail with reference to the following Figures.

In a simplified, schematic representation.

DETAILED DESCRIPTION OF THE PREFERRED EMBODIMENTS

Figure 1:
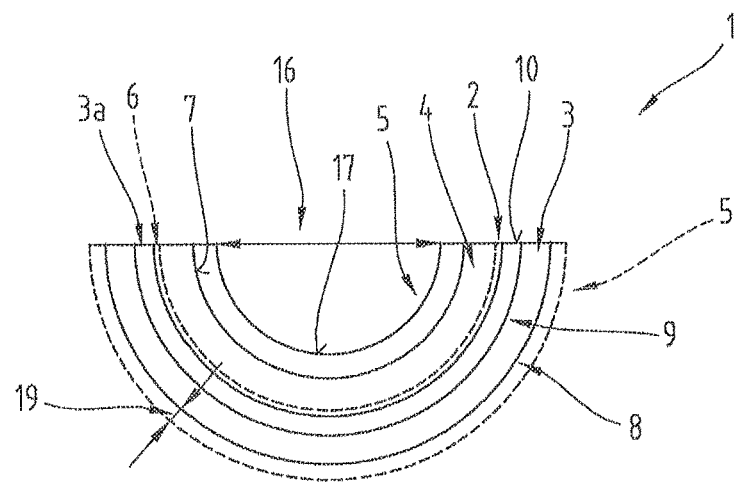
FIG. 1 is a radial sliding bearing element in the form of a half shell in side view.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

FIG. 1 shows in side view a metal sliding bearing element 1, in particular a radial sliding bearing element. The latter comprises a sliding bearing element body 2. The sliding bearing element body 2 comprises in this sequence, a supporting layer 3, at least one bearing metal layer 3a arranged thereon, at least one running layer 4 arranged thereon and at least one additional layer 5 arranged on the at least one running layer 4 (cover layer) or consists of the supporting layer 3, the at least one running layer 4 and the joined at least one additional layer 5. The at least one additional layer 5 is preferably arranged directly on the at least one running layer 4 and joined to the latter.

The term "at least one" with regard to the running layer 4 and the additional layer 5 means that it is possible for the running layer 4 to be formed from a plurality of individual running layers with different compositions and/or the additional layer 5 can be made up of several individual running layers with different compositions or can consist of said plurality of individual layers. However, it is also possible for the concentration of at least individual alloy elements in the running layer 4 and/or the further layer 5 to decrease or increase continually in the direction of the radial inner surface of the sliding bearing element 1. In all of these cases the composition of the running layer 4 and the additional layer 5 according to the following details on the general composition of the two layers according to table 1 is such that the latter show the average proportions of the individual alloy elements in the whole running layer 4 and the whole additional layer 5.

In addition it is possible that the running layer 4 is arranged directly on a support element, which forms in particular the supporting layer 3, so that a bearing metal layer 3a is not necessary. This direct coating is used for example in connecting rods. The at least one additional layer 5 is also arranged on the running layer 4 in this embodiment variant. If necessary, a bonding layer and/or a diffusion barrier layer can be arranged between the support element and the at least one running layer 4.

As indicated by dashed lines in FIG. 1, the sliding bearing element body 2 can also have additional layers, for example at least one intermediate layer 6, which is arranged between the at least one additional layer 4 and the at least one running layer 3. The at least one intermediate layer 6 can be for example a diffusion barrier layer and/or at least one bonding layer.

It is also possible that the at least one further layer 5 is arranged not only on a radial inner surface 7 of the at least one running layer 4, but that the at least one further layer 5 is also arranged on a sliding bearing element rear 8, as also indicated by dashed lines in FIG. 1. According to a further embodiment variant it is also possible that the at least one further layer 5 is arranged on at least approximately all or on all of the surfaces of the sliding bearing element body 2, i.e. also on axial end faces 9 and/or radial end faces 10.

The sliding bearing element 1 forms together with at least one further sliding bearing element a sliding bearing—depending on the structure also more than one additional sliding bearing element can be provided—, as already known. Here preferably the sliding bearing element loaded more strongly during operation is formed by the sliding bearing element 1 according to the invention. However, it is also possible that at least one of the at least one additional sliding bearing elements is formed by the sliding bearing element 1 according to the invention.

The sliding bearing element 1 according to FIG. 1 is designed in the form of a half shell. It is also possible to design the sliding bearing element 1 as a sliding bearing bush. In this case the sliding bearing element 1 is simultaneously the sliding bearing. Furthermore, a different division is possible, for example division into three parts, so that the sliding bearing element 1 is combined with two further sliding bearing elements to form a sliding bearing, wherein at least one of the two additional sliding bearing elements can also be formed by the sliding bearing element 1. In this case the sliding bearing element does not cover an angular range of 180° but one of 120°.

In particular, the sliding bearing element 1 is provided for use in the motor industry or in engines according to the above explanations.

The supporting layer 3 is preferably made of steel, but can also be made of other suitable material such as e.g. bronze.

The bearing metal layer 3a is preferably made from a copper-based alloy or an aluminum-based alloy, as known from the prior art for these purposes. For example the bearing metal layer 3a can be made from an alloy with a copper base according to DIN ISO 4383, such as e.g. CuSn10, CuAl10Fe5Ni5, CuZn31Si, CuPb24Sn2, CuSn8Bi10, CuSn4Zn.

The at least one intermediate layer 6 consists of a material known for this purpose from the prior art.

The at least one running layer 4 consists of at least one first tin-based alloy. The at least one further layer 5 consists of at least one further tin-based alloy. Both the at least one first tin-based alloy and the at least one further tin-based alloy consists of a matrix made from beta-tin grains and one or more element(s) from a group comprising or consisting of Cu, Ni, Ag, Sb, Pb, Bi, Te, Tl. Furthermore, alternatively to this, at least one element or in addition non-metal particles can be contained in the at least one first tin-based alloy and/or the at least one additional tin-based alloy. The non-metal particles are in particular inorganic particles, for example $Al_2O_3$, $Si_3N_4$, $TiO_2$, SiC, etc. Preferably, the inorganic particles have a maximum particle size of between 0.05 μm and 5 μm, in particular between 0.1 μm and 2 μm. The maximum particle size is determined by means of laser diffraction according to the standard ISO 13320:2009.

Figure 2:
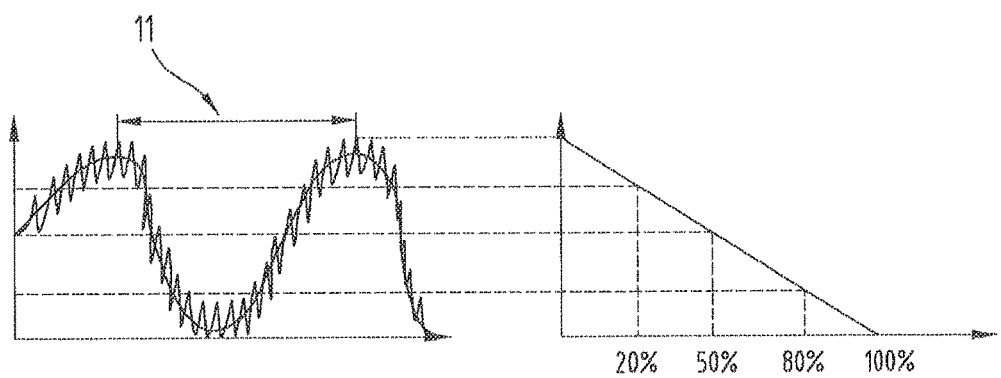
FIG. 2 shows a roughness curve (left) with a bearing area curve (right)

FIG. 2 shows a roughness profile (left part of the figure) and a bearing area curve (right part of the figure). In this way the underlying problem addressed by the invention is explained in more detail.

As explained above, reinforced surface coatings are used in a highly loaded radial sliding bearing. The usual finishing processes, such as fine boring or broaching, after the coating of the substrate by means of scoring effects cause the surface to become wavy in radial or axial direction. Said microwaves result in extremely high loads at the start of the operation with a reinforced surface coating. Due to the unevenness of the surface the shaft is mostly supported by the scored peaks, by means of an extremely thin oil film which may also peel off in some circumstances.

The left part of FIG. 2 shows a roughness profile, produced by fine boring, in which the profile has been taken in axial direction.

The shafts are formed by the rotation of the fine bore spindle, a distance 11 is formed between the shaft tips of e.g. 0.1-0.2 mm by the forward feed per rotation.

The actual, random roughness overlayers the waviness, the bandwidth of which is often only a fraction of the profile height—in this case about a quarter, as shown in FIG. 2 by the jagged profile of the waviness.

On the right in FIG. 2 the bearing area curve (Abbott curve) is shown relative to the roughness profile on the left.

Due to the low plastic deformation and the wear of the top roughness peaks in this example at the beginning of the running-in of the sliding bearing element there is a load-bearing area of only about 20%.

The lubricant also transmits a portion of the forces into deeper lying profile areas, where this portion is low particularly when using thin lubricant oils.

It is thus expected that there will be approximately 2 to 5 times more localized loading on the surface. By means of the excellent wearing resistance of the reinforced coating the running-in phase, the period up to about 80% of the profile (and taking into account the lubricant thus about 100% of the surface) for supporting the shaft, will be delayed considerably.

The localized loading increased about 2 to 5 times can also outstrip the fatigue strength of reinforced layers and thus result in premature damage.

Not only small differences in the surface at a distance of about 0.1 mm can reduce the localized bearing area, but also differences in form of similar height at a distance of millimeters (on the edges) or centimeters (in wand thickness fluctuations of the running surface) can have an unfavorable effect on the bearing area.

Figure 3:
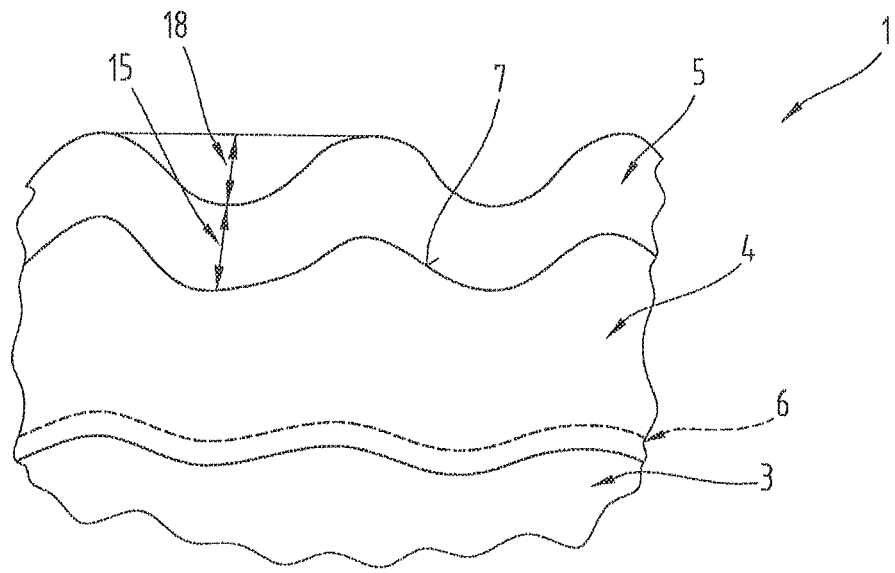
FIG. 3 shows a section of the sliding bearing element according to FIG. 1.

In order to overcome these problems of highly loaded sliding bearing elements more effectively, the sliding bearing element 1 according to the invention comprises a combination of the at least one running layer 4 and the at least one additional layer 5, which is preferably arranged directly on the at least one running layer 4. For this FIG. 3 shows a section of the sliding bearing element 1 according to FIG. 1. As shown in this Figure the at least one further layer 5 emulates the waviness of the surface 7 of the at least one additional running layer 4.

Here the at least one running layer 4 consists of the at least one first tin-based alloy, wherein the at least one first tin-based alloy has a strength index FI of at least 5 and at most 25, in particular at least 10 and at most 25. The at least one further layer 5 consists of the at least one additional tin-based alloy, wherein said tin-based alloy only has a strength index FI of at least 0.3 and at most 3, in particular at least 0.3 and at most 1.5.

With this combination of the two layers it is possible that the wear of the at least one additional layer 5 of several micrometers leads to a clear improvement in the bearing area and thus to a significant reduction of localized loads.

The strength index FI is defined by the equation $$FI = 100 * \omega C + 50 * \omega S + 2 * \sqrt[2]{(100 * \omega B)},$$

in which C represents at least one of the elements Cu, Ni, Ag; S represents Sb and/or non-metal particles; B represents at least one of the elements Pb, Bi, Te, Tl; and ω represents the total content of each of the tin-based alloy components assigned to the letters C, S, and B.

Below a strength index of 0.3 of the additional layer 5 it was not possible to observe any improvement in the tribological behavior of the sliding bearing element 1 compared to those with pure tin layers. The reason for this is probably that technical pure tin naturally has impurities. Tin today is usually obtainable with a purity of >99.95%. Individual impurities of lead, antimony and bismuth (the three main impurities) each in the region of about 0.005-0.01% are standard. When using galvanic production methods the elements antimony and bismuth are generally reduced further, as they dissolve from the anode only slightly into the electrolytes. Thus the deposited tin, which is used for example for the so-called tin flash, has an even lower content of impurities. A strength index of at least 0.3 can thus not be achieved with pure tin with the usual impurities.

Tin alloys which are not doped with lead, antimony or bismuth are not sufficiently protected from allotropic transformation in cool storage. The period up to the beginning of the transformation and the transformation speed can be delayed sufficiently by a total amount of lead, bismuth and antimony of 0.04%.

With a strength index of the additional layer 5 of more than 3 the adjustability of the additional layer 5 is reduced by the then already increased strength.

It is also possible to form a transitional area between the at least one running layer 4 and the at least one additional layer 5. For this reason in the description the terms "at least one running layer 4" and "at least one additional layer 5" are used, as in this way the running layer 4 and/or the additional layer 5 can be seen to be multilayered.

The transitional area between the running layer 4 and the further layer 5 can have a strength index FI of at least 3 and at most 5.

It is thus possible to design the layer system of a running layer 4 and additional layer 5 as a gradient layer with respect to the course of the au strength index in radial direction.

Preferably, the transitional area has a layer thickness which is not greater than the layer thickness 15 of the additional layer 5. The aforementioned values for the layer thickness 15 of the additional layer 5 therefore also apply to the transitional area.

Preferably, the running layer 4 also contains a total proportion of lead, bismuth and antimony of at least 0.04%.

With a strength index FI of the running layer 4 of less than 5 the latter has a wearing resistance which does not correspond with the desired property profile of the sliding bearing element 1. Furthermore, it ability to adapt and embed dirt (also in a run-in state) decreases significantly at a strength index of more than 25.

The at least one further layer 5 is preferably galvanically deposited. In addition the at least one running layer 4 is preferably galvanically deposited. As the galvanic deposition is known, reference is made to the relevant prior art, for example to AT 509 111 B1 or AT 509 867 B1 with the same applicant, which is incorporated into the present description in relation to the conditions of the galvanic deposition of the tin-based alloy(s).

Preferably, after the deposition of the at least one further layer 5 it is no longer necessary to finish the sliding bearing element 1 for example by fine boring.

If the at least one further layer 5 is also to be deposited on the sliding bearing element rear 8 on the other surfaces of the sliding bearing element 1, in particular in the form of a thin, visually appealing tin flash which protects from the formation of rust, the latter can be combined with the deposition of the at least one additional layer 5 on the radially inner side of the sliding bearing element 1. The layer thickness can thereby be reduced on the sliding bearing element rear 8, in that radially inward and radially outwards the current density and/or coating time is selected to differ accordingly.

The non-metal particles can be added to the respective galvanic bath as such and co-deposited with the tin.

The respective strength indices of the at least one running layer 4 and the at least one additional layer 5 are adjusted by the compositions of the respective layers. In general said layers can have the proportions of the individual components given in the following table 1, where tin made up the remainder to 100 wt. %. All of the details of proportions in table 1, and generally in the whole description are given in wt. % (provided that nothing else is described in particular).

TABLE 1

Proportions of the tin-based alloys

| | Running layer 4 | Preferred range running layer 4 | Layer 5 | Preferred range layer 5 |
|---|---|---|---|---|
| Cu | 0-25 | 7-13 or 2-5 (in particular when Sb is contained in the given proportion) | 0-3 | <1 |
| Ni | 0-25 | 0 (Impurities by diffusion to 1) | 0-3 | 0 (Impurities by diffusion to 0.1) |
| Ag | 0-25 | 0-10 | 0-3 | 0 |
| Sb | 0-40 | 1.5-5 or 6-13 (in particular when Cu is contained in the given proportion) | 0-6 | <1 |
| As | 0-10 | 0-0.8 | 0-6 | 0-0.8 |
| Pb | In total | 0-0.05 (max. 0.2) | In total | 0-0.05 (max. 0.2) |
| Bi | | 0-0.5 | | 0-0.5 |
| Te | 0-10 | 0 | 0-10 | 0 |
| Tl | | 0 | | 0 |
| Non-metallic particles | 0-10 | 0 | 0-6 | 0 |

These details about the composition are such that the tin-based alloys of the running layer 4 and the further layer 5 in any case contain at least one of said alloy elements in table 1, as otherwise the desired strength indices of said layers are not achieved. Thus pure tin is excluded for the running layer 4 and pure tin for the additional layer 5.

According to preferred embodiment variants of the sliding bearing element 1 it is possible that the tin-based alloy of the at least one running layer 4 contains between 2 wt. % and 12 wt. % antimony and/or between 2 wt. % and 12 wt. % copper, and/or that the tin-based alloy of the at least one additional layer 5 contains between 0 wt. % and 0.5 wt. % copper or between 0 wt. % and 0.5 wt. % antimony or between 0 wt. % and 0.5 wt. % copper and antimony, and between 0.01 and 10 wt. % bismuth or between 0.01 and 2 wt. % lead or between 0.01 and 10 wt. % bismuth and lead.

According to a further preferred embodiment variant of the sliding bearing element 1 it is possible that the tin-based alloy of the at least one running layer 4 and/or the at least one additional layer 5 contain a total proportion of alloy elements given in the table 1, in particular the elements tin, antimony and bismuth, of at least 0.04 wt. %, in particular at least 0.3 wt. %, wherein the upper limit of the proportion of said elements in said layer or layers is defined by the above data.

The following tables show several comparison examples and embodiments of sliding bearing elements 1 according to the invention.

Different variants of the additional layer 5 on sliding bearing half shells (width 25 mm, diameter 80 mm) are specified and subjected to a dynamic sliding bearing test. The used sliding bearing shells had a disadvantageous surface quality (Ra=0.7 μm, Rq=0.8 μm, Rz=2.8 μm, Rt=3 μm).

Two tests were performed, one a test without tilting the running surface (variant 1), the second test with tilting the running surface by 0.5 μm/mm (variant 2). This second test exerts an extreme load on an edge, as occurs with non-ideally aligned bores or e.g. a buckles connecting rod. The first test was evaluated for wear and microscopic findings, the second test by visual and microscopic assessment. The individual assessments were summarized by an overall assessment number 0-5 (0=very poor, 5=very good).

For a better comparison the structure of the layer of the sliding bearing element 1 including the running layer 4 was kept constant and only the additional layer 5 varied.

The thickness of the coating, unless otherwise indicated, was also kept constant at 20 μm and comprises the thickness of the running layer 4 and in the examples according to the invention of the further layer 5.

In the composition column the numbers after the elements indicate the percentage of their mass (e.g. SnTe1 means tin with 1 wt. % tellurium). The abbreviation FI stands for the strength index. In the left column in the tables for the structure the number 5 stands for the additional layer 5 and the number 4 stands for the running layer 4. In the results tables in the left column the number 1 stands for variant 1 and the number 2 for variant 2. This nomenclature is used for tables relating to the examples throughout the description.

Comparative Example 1

Structure

| | Layer thickness | Composition | FI |
|---|---|---|---|
| 5 | 1 μm | SnPb0.1 misc. elements <0.005% | 0.4 |
| 4 | 19 μm | SnCu2Pb0.5 misc. elements <0.005% | 3.4 |

Results

| | Wear | Visual and microscopic findings | |
|---|---|---|---|
| 1 | 22 μm | Total wear, runs into bearing metal | 1 |
| 2 | — | Total wear, runs into bearing metal | 1 |

The additional layer 5 was shown to be too thin and the running layer 4 too soft.

Comparative Example 2

Structure

| | Layer thickness | Composition | FI |
|---|---|---|---|
| 5 | 1.5 μm | Sn misc. elements <0.005% | <0.3 |
| 4 | 18.5 μm | SnCu8Pb0.1 misc. elements <0.005% | 8.6 |

Results

| | wear | Visual and microscopic findings | |
|---|---|---|---|
| 1 | 6 μm | Low wear, heavy fatigue fractures | 3 |
| 2 | — | Total wear on one side, heavy fatigue fractures | 2 |

The additional layer 5 was shown to be too soft.

Comparative Example 3

Structure

| | Layer thickness | Composition | FI |
|---|---|---|---|
| 5 | 0 μm | | |
| 4 | 20 μm | SnCu16Sb3Bi0.15 misc. elements <0.005% | 18.3 |

Results

| | Wear | Visual and microscopic findings | |
|---|---|---|---|
| 1 | 4 μm | Very low wear, heavy fatigue fractures | 3 |
| 2 | — | Attrition | 0 |

Comparative Example 4

Structure

| | Layer thickness | Composition | FI |
|---|---|---|---|
| 5 | 2 μm | SnPb0.2Sb0.1 misc. elements <0.005% | 0.5 |
| 4 | 18 μm | SnSb6Cu0.5Pb0.25 misc. elements <0.005% | 4.5 |

Results

| | Wear | Visual and microscopic findings | |
|---|---|---|---|
| 1 | 10 μm | Significant wear, fatigue fractures | 3 |
| 2 | — | Total wear on one side, heavy fatigue fractures | 2 |

With this layer structure the running layer 4 is too soft.

Comparative Example 5

Structure

| | Layer thickness | Composition | FI |
|---|---|---|---|
| 5 | 0.5 μm | SnPb0.2Sb0.1 misc. elements <0.005% | 0.5 |
| 4 | 19.5 μm | SnSb8Cu0.3Pb0.2 particles-ZrO$_2$ d50 = 0.1 μm. 1% misc elements <0.005% | 5.7 |

Results

| | wear | Visual and microscopic findings | |
|---|---|---|---|
| 1 | 7 μm | Significant wear, fatigue fractures | 3 |
| 2 | — | Total wear on one side, heavy fatigue fractures | 2 |

The additional layer 5 is too thin.

Comparative Example 6

Structure

| | Layer thickness | Composition | FI |
|---|---|---|---|
| 5 | 1 μm | Sn misc. elements <0.005% | <0.3 |
| 4 | 19 μm | SnAg5Cu1 misc. elements <0.005% | 6 |

Results

| | Wear | Visual and microscopic findings | |
|---|---|---|---|
| 1 | 7 μm | Significant wear, fatigue fractures | 3 |
| 2 | — | Total wear on one side, heavy fatigue fractures | 2 |

The additional layer 5 is too thin and too soft.

Comparative Example 7

Structure

| | Layer thickness | Composition | FI |
|---|---|---|---|
| 5 | 1 μm | Sn misc. elements <0.005% | <0.3 |
| 4 | 19 μm | SnNi8Te0.5 misc. elements <0.005% (Sputter) | 9.4 |

Results

| | Wear | Visual and microscopic findings | |
|---|---|---|---|
| 1 | 8 μm | Significant wear, fatigue fractures | 3 |
| 2 | — | Total wear on one side, heavy fatigue fractures | 2 |

The additional layer 5 is too soft.

Comparative Example 8

Structure

| | Layer thickness | Composition | FI |
|---|---|---|---|
| 5 | 1 μm | SnSb1Cu1 misc. elements <0.005% | 1.5 |
| 4 | 19 μm | SnSb15Cu5 misc. elements <0.005% | 12.5 |

Results

| | Wear | Visual and microscopic findings | |
|---|---|---|---|
| 1 | 4 μm | Very low wear, heavy fatigue fractures | 3 |
| 2 | — | Attrition | 0 |

The additional layer 5 is too thin.

Comparative Example 9 (Similar to GB 2 375 801 A, Page 9, Examples 3 and 4)

Structure

| | Layer thickness | Composition | FI |
|---|---|---|---|
| 5 | 18 μm | SnCu4Sb0.6 misc. elements <0.005% | 4.3 |
| 4 | 2 μm | SnCu15Sb2 misc. elements <0.005% | 16 |

Results

| | Wear | Visual and microscopic findings | |
|---|---|---|---|
| 1 | 15 μm | Heavy wear, fatigue fractures | 2 |
| 2 | — | Total wear, runs into bearing metal | 1 |

The additional layer 5 is too thick.

Example of the Invention 1

Structure

| | Layer thickness | Composition | FI |
|---|---|---|---|
| 5 | 3 μm | SnPb0.1 misc. elements <0.005% | 0.6 |
| 4 | 17 μm | SnCu8Pb0.1 misc. elements <0.005% | 8.6 |

Results

| | wear | Visual and microscopic findings | |
|---|---|---|---|
| 1 | 7 μm | Significant wear, light fatigue fractures | 4 |
| 2 | — | Heavy wear on one side, heavy fatigue fractures | 2 |

There was an improvement in the bearing capacity of the sliding bearing element 1 compare to comparative example 2.

Example of the Invention 2

Structure

| | Layer thickness | Composition | FI |
|---|---|---|---|
| 5 | 4 μm | SnCu2Sb0.5Bi0.1 | 2.9 |
| 4 | 16 μm | SnCu16Sb3Bi0.15 misc. elements <0.005% | 18.3 |

Results

| | Wear | Visual and microscopic findings | |
|---|---|---|---|
| 1 | 7 μm | Significant wear, light fatigue fractures | 4 |
| 2 | — | Wear on one side, fatigue fractures | 3 |

In this example there is also an improvement in the bearing capacity of the sliding bearing element when compared to comparative example 3.

Example of the Invention 3

Structure

| | Layer thickness | Composition | FI |
|---|---|---|---|
| 5 | 2 μm | SnPb0.2Sb0.1 misc. elements <0.005% | 0.5 |
| 4 | 18 μm | SnSb9Cu1Pb0.25 misc. elements <0.005% | 6.5 |

Results

| | Wear | Visual and microscopic findings | |
|---|---|---|---|
| 1 | 7 μm | Significant wear, fatigue fractures | 3 |
| 2 | — | Wear on one side, fatigue fractures | 3 |

Here there was an improvement with respect to both variations of the test compared with comparative example 4.

Example of the Invention 4

Structure

| | Layer thickness | Composition | FI |
|---|---|---|---|
| 5 | 3 μm | SnAg1 misc. elements <0.005% | 1 |
| 4 | 17 μm | SnAg8Cu1 misc. elements <0.005% | 6 |

Results

| | Wear | Visual and microscopic findings | |
|---|---|---|---|
| 1 | 6 μm | Significant wear, light fatigue fractures | 4 |
| 2 | — | Wear on one side, fatigue fractures | 3 |

Here there was an improvement with respect to the load bearing ability of the sliding bearing element 1 compared with comparative example 6.

Example of the Invention 5

Structure

| | Layer thickness | Composition | FI |
|---|---|---|---|
| 5 | 3 μm | SnCu1 misc. elements <0.005% | 1 |
| 4 | 17 μm | SnNi8Te0.5 misc. elements <0.005% (Sputter) | 9.4 |

Results

| | Wear | Visual and microscopic findings | |
|---|---|---|---|
| 1 | 8 μm | Significant wear, light fatigue fractures | 4 |
| 2 | — | Total wear on one side, heavy fatigue fractures | 2 |

There was an improvement in terms of the fatigue fracture compared to comparative example 7.

Example of the Invention 6

Structure

| | Layer thickness | Composition | FI |
|---|---|---|---|
| 5 | 5 μm | SnSb1Cu1 misc. elements <0.005% | 1.5 |
| 4 | 15 μm | SnSb15Cu5 misc. elements <0.005% | 12.5 |

Results

| | Wear | Visual and microscopic findings | |
|---|---|---|---|
| 1 | 7 μm | Significant wear, no fatigue fractures | 4 |
| 2 | — | Wear on one side, light fatigue fractures | 4 |

Compared with comparative example 8 the wear is greater in a direction normal to the sliding surface, however an improvement was achieved with regard to the test variant 2.

Example of Invention 7

Structure

| | Layer thickness | Composition | FI |
|---|---|---|---|
| 5 | 3 μm | SnCu2Sb0.6 misc. elements <0.005% | 2.3 |
| 4 | 17 μm | SnCu15Sb2 misc. elements <0.005% | 16 |

Results

| | Wear | Visual and microscopic findings | |
|---|---|---|---|
| 1 | 5 μm | Low wear, no fatigue fractures | 5 |
| 2 | — | Wear on one side, light fatigue fractures | 4 |

Compared with comparative example 9 there was an improvement with regard to a non-tilted and also with regard to a tilted bearing.

Example of the Invention 8

Structure

| | Layer thickness | Composition | FI |
|---|---|---|---|
| 5 | 3 μm | SnCu2Sb0.6Pb0.05 misc. elements <0.005% | 2.7 |
| 4 | 17 μm | SnCu18Sb8Pb1 misc. elements <0.005% | 24 |

Results

| | Wear | Visual and microscopic findings | |
|---|---|---|---|
| 1 | 5 μm | Low wear, no fatigue fractures | 5 |
| 2 | — | Attrition | 0 |

As shown by the results, this embodiment variant is not very suitable for tilted bearings.

Example of the Invention 9

Structure

|   | Layer thickness | Composition | FI |
|---|---|---|---|
| 5 | 5 μm | SnCu1Sb0.6Pb0.05 misc. elements <0.005% | 1.7 |
| 4 | 15 μm | SnSb26Pb1 misc. elements <0.005% | 15 |

Results

|   | Wear | Visual and microscopic findings |   |
|---|---|---|---|
| 1 | 8 μm | Significant wear, light fatigue fractures | 4 |
| 2 | — | Total wear on one side, heavy fatigue fractures | 2 |

High Sb

The results are similar to the preceding example 9, wherein here there is an improvement with regard to the tilted bearings.

Example of the Invention 10

Structure

|   | Layer thickness | Composition | FI |
|---|---|---|---|
| 5 | 6 μm | SnCu2Bi0.5 misc. elements <0.005% | 2.4 |
| 4 | 14 μm | SnCu23Bi1 misc. elements <0.005% | 25 |

Results

|   | Wear | Visual and microscopic findings |   |
|---|---|---|---|
| 1 | 10 μm | Significant wear, light fatigue fractures | 4 |
| 2 | — | Total wear on one side, heavy fatigue fractures | 2 |

Said sliding bearing element 1 shows a similar bearing capacity to example 10.

Example of the Invention 11

Structure

|   | Layer thickness | Composition | FI |
|---|---|---|---|
| 5 | 8 μm | SnCu1Sb0.5 misc. elements <0.005% | 1.25 |
| 4 | 12 μm | SnCu7Sb7Bi0.1Pb0.1 misc. elements <0.005% | 11.4 |

Results

|   | Wear | Visual and microscopic findings |   |
|---|---|---|---|
| 1 | 10 μm | Significant wear, light fatigue fractures | 4 |
| 2 | — | Wear on one side, fatigue fractures | 3 |

By means of the very high thickness of the additional layer 5 relative to the running layer 4 the wear increased with respect to loading normal to the sliding surface.

Example of the Invention 12

Structure

|   | Layer thickness | Composition | FI |
|---|---|---|---|
| 5 | 2.5 μm | SnPb0.01Bi0.02 misc. elements <0.005% | 0.35 |
| 4 | 18 μm | SnCu9Sb5Bi0.2Pb0.1 misc. elements <0.005% | 12.6 |

Results

|   | Wear | Visual and microscopic findings |   |
|---|---|---|---|
| 1 | 6 μm | Low wear, light fatigue fractures | 5 |
| 2 | — | Wear on one side, light fatigue fractures | 4 |

This structure according to example 12 shows good results with respect to both test variants so that it can be applied both in non-tilted and in tilted bearings.

Example of the Invention 13

Structure

|   | Thickness | Composition | Index |
|---|---|---|---|
| 1 | 3 μm | SnBi2 misc. elements <0.005% | 2.8 |
| 2 | 17 μm | SnCu8Bi8 misc. elements <0.005% | 13.7 |

Results

|   | Wear | Visual and microscopic findings |   |
|---|---|---|---|
| 1 | 5 μm | Low wear, no fatigue fractures | 5 |
| 2 | — | Wear on one side, fatigue fractures | 3 |

Furthermore, also two tests were carried out by the directly coated boring of a connecting rod, wherein in both cases the final bore internal diameter as in the test bearings had a significantly higher layer thickness of 40 μm.

In these tests the coatings were applied directly onto the steel provided with a thin, adhesive intermediate layer.

Comparative Example 10

Structure

|   | Layer thickness | Composition | FI |
|---|---|---|---|
| 5 | — | — | — |
| 4 | 40 μm | SnSb15Cu5 misc. elements <0.005% | 12.5 |

Results

|   | Wear | Visual and microscopic findings |   |
|---|---|---|---|
| 2 | — | Attrition | 0 |

Example of the Invention 14

Structure

| | Layer thickness | Composition | FI |
|---|---|---|---|
| 5 | 5 μm | SnSb1Cu1 misc. elements <0.005% | 1.5 |
| 4 | 35 μm | SnSb15Cu5 misc. elements <0.005% | 12.5 |

Results

| | Wear | Visual and microscopic findings | |
|---|---|---|---|
| 1 | 10 μm | Significant wear, fatigue fractures | 3 |

Comparative Example 11

Structure

| | Layer thickness | Composition | FI |
|---|---|---|---|
| 5 | 1 | Sn misc. elements <0.005% | <0.3 |
| 4 | 39 μm | SnCu15Sb5 misc. elements <0.005% | 17.5 |

Results

| | Wear | Visual and microscopic findings | |
|---|---|---|---|
| 1 | — | Attrition | 0 |

Example of the Invention 15

Structure

| | Layer thickness | Composition | FI |
|---|---|---|---|
| 5 | 10 μm | SnSb2Cu2 misc. elements <0.005% | 3.0 |
| 4 | 30 μm | SnCu15Sb5 misc. elements <0.005% | 17.5 |

Results

| | Wear | Visual and microscopic findings | |
|---|---|---|---|
| 1 | 15 μm | Significant wear, light fatigue fractures | 4 |

As already mentioned, the running layer 4 can consist of several part layers having different compositions. It is possible in this way that the strength index of said part layers is greater in the direction of the sliding bearing element rear 8. The same applies to the at least one additional layer 5. Compositions of the individual part layers can be selected according to the examples given in table 2 or generally from the values given in table 1 for the proportions of the individual components of the tin-based alloys.

For example, in the following the production of a running layer 4 and a further layer 5 of a plurality of part layers is described. With regard to the possible additives to the produced electrolytes reference is made to AT 509 112 B1, which is referred to in particular here.

Example of the Invention 16

Electrolyte for depositing the running layer 4:
Sn . . . 50 g/L (as tin (II)tetrafluoroborate)
Sb . . . 7 g/L (as antimony trifluoride)
Cu . . . 7 g/L (as copper tetrafluoroborate)
Bath temperature 40° C.

| | Current density | Duration | Thickness | Composition | FI |
|---|---|---|---|---|---|
| Partial layer 1 | 1 A/dm$^2$ | 10 min | 4.5 μm | SnSb15Cu15, misc. <0.005% | 22.5 |
| Partial layer 2 | 2 A/dm$^2$ | 5 min | 4.5 μm | SnSb10Cu10, misc. <0.005% | 15.0 |
| Partial layer 3 | 4 A/dm$^2$ | 3 min | 5 μm | SnSb6Cu7, misc. <0.005% | 10.0 |
| Partial layer 4 | 6 A/dm$^2$ | 1.5 min | 4.5 μm | SnSb4Cu5, misc. <0.005% | 7.0 |

Electrolyte for deposition of the additional layer 5
Sn . . . 40 g/L (as tin (II)tetrafluoroborate)
Sb . . . 0.5 g/L (as antimonytrifluoride)
Cu . . . 0.2 g/L (as copper tetrafluoroborate)
Bath temperature 25° C.

| | Current density | Duration | Thickness | composition | FI |
|---|---|---|---|---|---|
| Partial layer 1 | 1 A/dm$^2$ | 3 min | 1.5 μm | SnSb2Cu0.5, misc. <0.005% | 1.5 |
| Partial layer 2 | 2 A/dm$^2$ | 2 min | 2 μm | SnSb1Cu0.2 misc. <0.005% | 0.7 |

Example of the Invention 17

Electrolyte for deposition of the running layer 4
Sn . . . 50 g/L (as tin (II)methanesulfonate)
Cu . . . 7 g/L (as copper tetrafluoroborate)
Bi . . . 5 g/L (as bismuthhmethanesulfonate)
T 40° C.

| | current density | duration | Thickness | composition | FI |
|---|---|---|---|---|---|
| Partial layer 1 | 1 A/dm$^2$ | 10 min | 4.5 μm | SnCu10Bi7, misc. <0.005% | 15.3 |
| Partial layer 2 | 2 A/dm$^2$ | 5 min | 4.5 μm | SnCu8Bi5, misc. <0.005% | 12.5 |
| Partial layer 3 | 4 A/dm$^2$ | 3 min | 5 μm | SnCu6Bi4, misc. <0.005% | 10.0 |

Electrolyte for the deposition of the further layer 5
Sn . . . 20 g/L (as tin (II)methanesulfonate)
Bi . . . 1 g/L (as bismuthhmethanesulfonate)
Cu . . . 0.5 g/L (as copper tetrafluoroborate)
Bath temperature 40° C.

| | Current density | Duration | Thickness | Composition | FI |
|---|---|---|---|---|---|
| Partial layer 1 | 1 A/dm$^2$ | 3 min | 1.5 μm | SnBi1.5Cu0.4 misc. <0.005% | 2.8 |

| | Current density | Duration | Thickness | Composition | FI |
|---|---|---|---|---|---|
| Partial layer 2 | 2 A/dm² | 2 min | 2 μm | SnBi0.5Cu0.2 misc. <0.005% | 1.6 |

In the following further embodiment variants of the sliding bearing element 1 are described.

Figure 4:
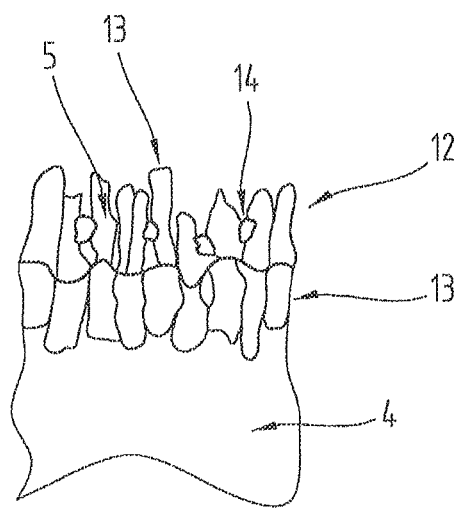
FIG. 4 shows a section of an embodiment variant of a sliding bearing element.

As shown in FIG. 4, the additional layer 5 can consist of only one grain layer 12 on beta-tin grains 13. Here intermetallic phases 14 of the or with the other components of the tin-based alloy of the additional layer 5 or the non-metal particles can be embedded between said beta-tin grains 13 at the grain boundaries. As shown in FIG. 4, due to the different grain size of the beta-tin grains 13 of the running layer 4 at the interface with the additional layer 5 an uneven running layer surface is formed, wherein the beta-tin grains 13 of the additional layer 5 are deposited directly on the beta-tin grains 13 of the running layer 4. In this way a type of toothing effect can be achieved which provides a greater bonding strength of the further layer 5 onto the running layer 4.

Preferably, the beta-tin grains 13 in the at least one additional layer 5, for the aforementioned reasons, can have an average grain size of between 10% and 90% of a layer thickness 15 (FIG. 3) of the at least one additional layer 5.

The average grain size is determined by laser diffraction, as described above.

$$M\{hkl\} = \frac{I\{hkl\} \sum I^{o}\{hkl\}}{I^{o}\{hkl\} \sum I\{hkl\}}$$

wherein $I\{hkl\}$ represents the XRD intensities (X-ray diffraction intensities) for the $\{hkl\}$ levels of the sliding layer and $I^{o}\{hkl\}$ represents the XRD intensities of the completely unorientated tin powder sample (ICDD PDF 00-004-0673).

The sum of the diffraction intensities $\Sigma I\{hkl\}$ or $\Sigma I^{o}\{hkl\}$ needs to be over the same range, for example comprise all of the intensities of the reflexes from $\{200\}$ to $\{431\}$, which when using CuKα, radiation corresponds to all reflexes with a diffraction angle 2θ between 30° and 90°.

In the following table the X-ray diffraction intensities (lines 3 to 5) and the associated orientation indices (lines 6 to 8) are shown of a SnCu10Sb5 running layer 4 with a proportion of further alloy elements of less than 0.005 wt. % and a strength index FI of 12.5 (abbreviation QZ2), of a SnCu10Sb5 running layer 4 with a proportion of further alloy elements of less than 0.005 wt. % and a strength index FI of 12.5 with a SnCu1Bi0.02 alloy as an additional layer 5 arranged thereon, which had a proportion of further alloy elements of less than 0.005 wt. % and a strength index FI of 1.3 (abbreviation QZ4) and a SnCu6Pb1 running layer according to the prior art (abbreviation Ref. 1). The abbreviation Sn-Ref. stands for the completely unoriented tin powder (ICDD PDF 00-004-0673).

TABLE

X-ray diffraction intensities and orientation indices

| HKL | 200 | 101 | 220 | 211 | 301 | 112 | 400 | 321 | 420 | 411 | 312 | 431 | Total |
|---|---|---|---|---|---|---|---|---|---|---|---|---|---|
| Sn-Ref | 100 | 90 | 34 | 74 | 17 | 23 | 13 | 20 | 15 | 14 | 20 | 13 | 433 |
| QZ2 | 100 | 43.5 | 63.5 | 55.3 | 12.4 | 9.4 | 9.3 | 20.2 | 13.9 | 9.4 | 10.2 | 7.6 | 354.7 |
| QZ4 | 18.5 | 13.4 | 100 | 79.1 | 8.9 | 3.2 | 3.7 | 35 | 16.1 | 9 | 7.4 | 12 | 306.3 |
| Ref 1 | 100 | 60 | 32.2 | 64 | 22 | 11 | 9.5 | 21 | 10.3 | 11 | 12.7 | 5.8 | 339.2 |
| I-QZ2 | 1.22 | 0.59 | 2.28 | 0.91 | 0.89 | 0.50 | 0.87 | 1.23 | 1.13 | 0.82 | 0.62 | 0.71 | |
| I-QZ4 | 0.26 | 0.21 | 4.16 | 1.51 | 0.74 | 0.20 | 0.40 | 2.47 | 1.52 | 0.91 | 0.52 | 1.30 | |
| Ref 1 | 1.28 | 0.85 | 1.21 | 1.10 | 0.17 | 0.61 | 0.93 | 1.34 | 0.88 | 0.96 | 0.81 | 0.57 | |

It is also preferable if the preferred orientation of the beta-tin grains 13 in at least two adjoining layers of the at least one running layer 4 and/or the at least one additional layer 5 is identical. In particular, the beta-tin grains 13 of the running layer 4 and the additional layer 5 arranged thereon and connected to the latter have the same preferred orientation. It is particularly preferable here if the X-ray diffraction intensity of the additional layer 5 with the highest orientation index is also the X-ray diffraction intensity with the highest orientation index of the running layer 4 or one of the three X-ray diffraction intensities of the running layer 4 with the highest orientation index, or if in particular also the X-ray diffraction intensities with the second and/or third-highest orientation index of the additional layer 5 is or are the X-ray diffraction intensities with the second and/or third highest orientation index of the running layer 4. X-ray diffraction intensities with an index of below 1.5, in particular below 2, are here ignored as being not sufficiently oriented.

Preferably the beta-tin grains 13 are oriented according to $\{220\}$ and/or $\{321\}$ (Miller indices).

For a quantitative description of the preferred orientation the orientation index M{hkl} with the following formula is used:

For the test results given in the following the orientation of QZ02 is referred to as alignment a, the orientation of QZ04 as alignment b and the orientation of Ref. 1 as alignment c.

Example of the Invention 18

Structure

| | Thickness | Composition | Index |
|---|---|---|---|
| 4 | 3 μm | SnCu1Bi0.02 <0.005% (alignment b) | 2.8 |
| 5 | 17 μm | SnCu10Bi5 misc. elements <0.005% (alignment a) | 13.7 |

Results

| | Wear | Visual and microscopic findings | |
|---|---|---|---|
| 1 | 5 μm | Low wear, no fatigue fractures | 5 |
| 2 | — | Wear on one side, light fatigue fractures | 4 |

Comparative Example

Structure

|   | Thickness | Composition | Index |
|---|---|---|---|
| 4 | 3 μm | SnCu1Bi0.02 <0.005% (alignment c) | 2.8 |
| 5 | 17 μm | SnCu10Bi5 misc. elements <0.005% (alignment a) | 13.7 |

Results

|   | Wear | Visual and microscopic findings |   |
|---|---|---|---|
| 1 | 7 μm | Significant wear, light fatigue fractures | 4 |
| 2 | — | Wear on one side, fatigue fractures | 3 |

Here the beta-tin grains 13, as shown in FIG. 4, have an elongated habitus and the beta-tin grains 13 are oriented with their longitudinal axis in a direction normal to the radial inner surface 17 (FIG. 1) of the sliding bearing element 1. In particular, it is an advantage if said elongated beta-tin grains 13 have an at least approximately quadratic cross-section (as viewed in a direction parallel to the running surface of the additional layer 5), as in this way the surface area of the grain boundaries can be reduced. In this way the bearing capacity of the sliding bearing element 1 can be improved.

For the same reasons it can also be an advantage if the beta-tin grains 13 have at least approximately dice-shaped form.

It was established in tests on different additional layers 5 that with a grain size of the beta-tin grains 13 of less than 0.2 μm very high internal tensions occur in the additional layer 5. With a grain size of more than 10 μm a surface is formed which prevents the even hold of the lubricant oil and thus the preferred formation of the lubricating gap.

According to a further embodiment variant of the sliding bearing element 1 it is possible that the average grain size, in particular the grain size, of the beta-tin grains 13 in the at least one additional layer 4 is greater than the average grain size, in particular the grain size, of the beta-tin grains 13 in the running layer 4. This can be achieved for example by changing the precipitation parameters during the galvanic deposition, in that for example the bath temperature is increased and/or the precipitation speed and/or the tin concentration in the galvanic bath are reduced. It is also possible to perform a subsequent temperature treatment on the sliding bearing element 1 for this purpose.

Preferably, the beta-tin grains 13 of the at least one additional layer 5 are grown directly on the beta-tin grains 13 of the running layer 5.

It is also preferable if the at least one further layer 5, at least in the region of the radial inner surface 7 (FIG. 3) of the running layer 4, has a layer thickness 15 (FIG. 3), which is selected from a range from at least $5*10^{-6}$ of a bearing inner diameter 16 (FIG. 1) to $50*10^{-6}$ of a bearing inner diameter 16 (FIG. 1), wherein the layer thickness 15 of the at least one additional layer 5 is at least 1.5 μm and at most 15 μm, preferably at least 2 μm and at most 10 μm, in particular at least 2.5 μm and at most 7.5 μm, or at least 2 μm and at most 6 μm.

The radial inner additional layer 5 can have a layer thickness 15, which is between 10% and 50%, in particular between 15% and 30%, of the total layer thickness formed by the layer thickness of the running layer 4 and the further layer 5.

It is also preferable if the layer thickness of the running layer 4 is greater than the layer thickness of the further layer 5, in particular greater than three time the layer thickness of the additional layer 5.

The bearing inner diameter 16 is the diameter of the sliding bearing element 1 on its radial innermost surface, as shown in FIG. 1. The waviness of the surface is considered by measuring at half the height of the waves.

As shown by the test results of the above examples of the invention, with a layer thickness of less than 1.5 μm the aforementioned effect of the at least one additional layer 5 is relatively weak so that the support element of the sliding bearing element 1 cannot be increased to the desired extent. In this way localized overloading of the sliding surface can only be avoided insufficiently. Furthermore, with a layer thickness 15 of the additional layer 5 of more than 15 μm said additional layer 5 is so thick that the running-in phase is extended again, as more time is required for the partial abrasion of the additional layer 5. In addition, with a layer thickness 15 of more than 15 μm the underlying higher strength running layer 4 of the at least one additional layer 5 can only provide insufficient support.

To give greater consideration to the surface topography of the at least one running layer 4 it is possible that the layer thickness 15 of the at least one additional layer 5 in the region of a radial inner surface 17 (FIG. 1) is greater than twice the arithmetic roughness average value Ra DIN EN ISO 4287:2010 of said surface 17 and/or the layer thickness 15 of the at least one additional layer 5 in the region of the radial inner surface 17 is smaller than twice the average roughness depth Rz DIN EN ISO 4287:2010 of said surface 17.

According to another embodiment variant it is possible that the layer thickness 15 (FIG. 3) of the at least one additional layer 5 is 0.3 times to 5 times, in particular 1 times to 2 times, as large as the average height 18 of the dominant waviness profile WDc of the surface 17 (FIG. 1) of said layer 5, measured normal to the processing direction according to the aforementioned VDA 2007.

In order to investigate the interaction of the surface roughness with the thickness of the at least one additional layer 5 tests were carried out as described above (variant 1 without tilting). The bearing shells had roughnesses in the range of Ra 0.3-0.7 μm and Rz 2-5. In addition in two thirds of the bearing shells a dominant waviness was discovered with WDc 0.5-2.5 μm.

The bearing shells were coated according to the example 11 of the invention, wherein the layer thickness 15 of the at least one additional layer 5 was varied between 0.1 and 12 μm.

Figure 5:
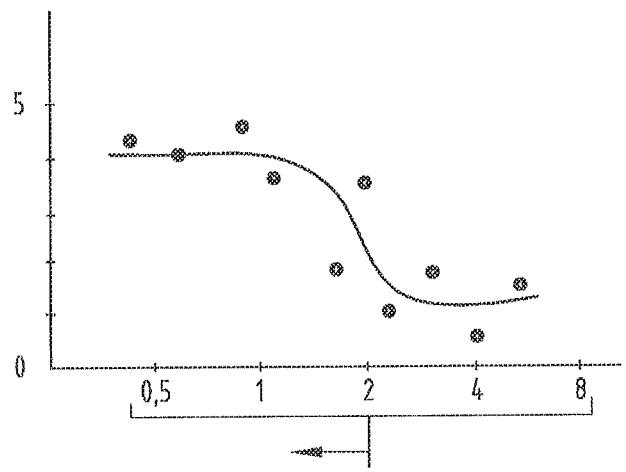
FIG. 5 shows the curve of the quotient of the layer thickness of the further layer to Rz as a function of the bearing capacity of the sliding bearing element.
Figure 6:
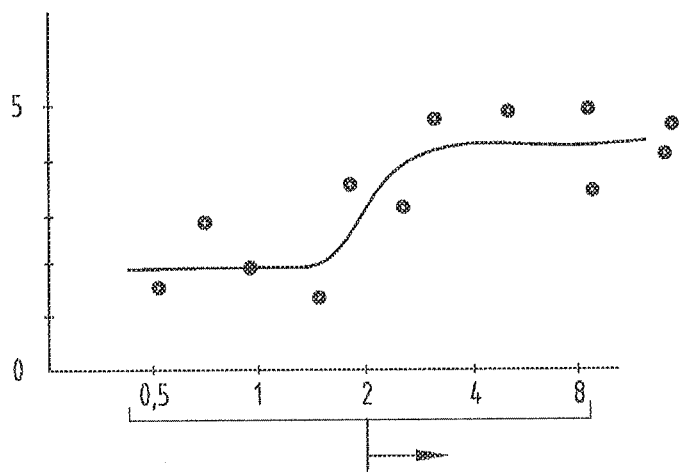
FIG. 6 shows the curve of the quotient of the layer thickness of the further layer to Ra as a function of the bearing capacity of the sliding bearing element.
Figure 7:
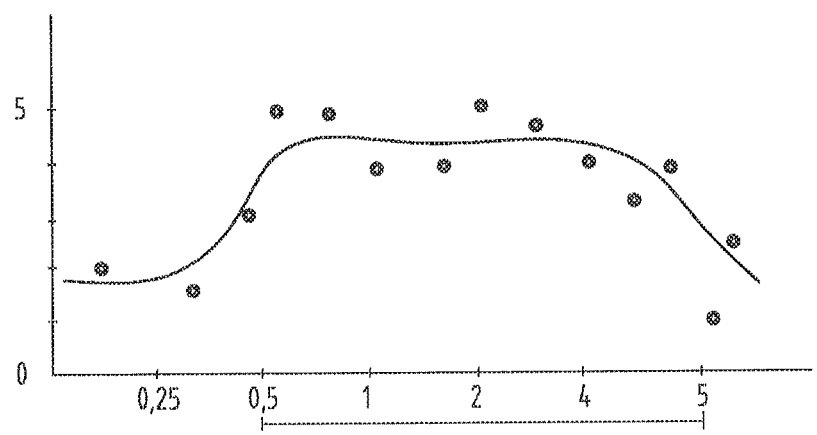
FIG. 7 shows the curve of the quotient of the layer thickness of the further layer to WDc as a function of the bearing capacity of the sliding bearing element.

FIGS. 5 to 7 show the result of tests according to the ratio of the layer thickness 15 of the at least one additional layer 5 of SnCu1Sb0.5 to the respective roughness parameter. The test results of the above variant 1 are shown on the y-axes. The ratio of the layer thickness 15 of the further layer 5 to Rz (FIG. 5) or Ra (FIG. 6) or Wdc (FIG. 7) is shown on the x-axes. The running layer 4 for these tests consisted of SnCu7Sb7BiPb.

It is evident from FIGS. 5 to 7 that it is an advantage if the layer thickness 15 is less than twice Rz and/or greater than twice Ra and/or is in the region of between WDc=0.5 to 5.

Furthermore, it is possible that a layer thickness 19 (FIG. 1) of the at least one additional layer 5 on the sliding bearing element rear 8 is between 0.1 times and 0.5 times the layer thickness 15 of the at least one additional layer 5 in the region of the radial inner surface 17.

With back layer thicknesses of 5 μm or more there is an increased risk of material displacement during operation, which can lead to the deformation of the bore and worsening of the rear bearing.

The range of 0.1-0.5 times the layer thickness 15 of the radial inner additional layer 5 has the advantage in a galvanic production process that by means of a moderate shortening (e.g. by a factor of 2-3) of the duration of the coating on the rear and/or a reduction of the current density a layer thickness 19 can be produced which provides sufficient protection from corrosion, but does not increase the risk of material displacement.

Reducing the current density too much can result in too great a change to the composition of the deposition and thus lead to reduced corrosion protection.

The example embodiments show possible embodiment variants of the sliding bearing element 1, whereby it should be noted at this point that various different combinations of the individual embodiment variants are also possible.

Finally, as a point of formality, it should be noted that for a better understanding of the structure of the sliding bearing element 1, the latter and its components have not been represented true to scale in part and/or have been enlarged and/or reduced in size.

LIST OF REFERENCE NUMERALS 1 sliding bearing element
2 sliding bearing element body
3 supporting layer
3a bearing metal layer
4 running layer
5 layer
6 intermediate layer
7 surface
8 sliding bearing element rear
9 end face
10 end face
11 distance
12 grain layer
13 beta-tin grain
14 phase
15 layer thickness
16 bearing inner diameter
17 surface
18 height
19 layer thickness

The invention claimed is:

1. A sliding bearing element comprising in this sequence a support element,
at least one running layer, and
at least one additional layer,
wherein the at least one running layer is formed by at least one first tin-based alloy and the at least one additional layer is formed by at least one additional tin-based alloy,
wherein the at least one first tin-based alloy and the at least one additional tin-based alloy contain at least one element of a group consisting of Cu, Ni, Ag, Sb, As, Pb, Bi, Te, Tl and non-metal particles, and the at least one first tin-based alloy and the at least one additional tin-based alloy contain beta-tin grains,
wherein the at least one first tin-based alloy has a strength index (FI) of at least 5 and at most 25 and the at least one additional tin-based alloy has a strength index of at least 0.3 and at most 3, the strength index of the running layer is at least five times the strength index of the at least one additional layer arranged directly on the running layer, and the strength index is defined by the equation, $$FI = 100 * \omega C + 50 * \omega S + 2 * \sqrt[2]{(100 * \omega B)},$$

in which
C represents at least one of the elements Cu, Ni, Ag; S represents Sb or non-metal particles or both Sb and non-metal particles;
B represents at least one of the elements Pb, Bi, Te, Tl; and
ω represents the total content of each of the tin-based alloy components assigned to the letters C, S, and B.

2. The sliding bearing element as claimed in claim 1, wherein the at least one additional layer is arranged directly on the running layer and on a sliding bearing element rear.

3. The sliding bearing element as claimed in claim 1, wherein the at least one additional layer at least in the region of a radial inner surface has a layer thickness, which is selected from a range of at least $5*10^{-6}$ of a bearing inner diameter to $50*10^{-6}$ of a bearing inner diameter,
wherein the layer thickness of the at least one additional layer is at least 1.5 μm and at most 15 μm.

4. The sliding bearing element as claimed in claim 3, wherein the layer thickness of the at least one additional layer in the region of the radial inner surface is greater than twice the arithmetic roughness average value of said radial inner surface.

5. The sliding bearing element as claimed in claim 3, wherein the layer thickness of the at least one additional layer in the region of the radial inner surface is smaller than twice the average roughness depth of said radial inner surface.

6. The sliding bearing element as claimed in claim 3, wherein a layer thickness of the at least one additional layer on the sliding bearing element rear is between 0.1 times and 0.5 times the layer thickness of the at least one additional layer in the region of the radial inner surface.

7. The sliding bearing element as claimed in claim 3, wherein the layer thickness of the at least one additional layer is 0.3 times to 5 times as large as the average height of the dominant waviness profile.

8. The sliding bearing element as claimed in claim 3, wherein the orientation of more than 50% of the beta-tin grains
in at least two adjoining layers of the at least one running layer or the at least one additional layer or both the at least one running layer and the at least one additional layer or
in the at least one running layer and the adjoining at least one additional layer is identical.

9. The sliding bearing element as claimed in claim 1, wherein the tin-based alloy of the at least one running layer contains between 0 wt. % and 40 wt. % antimony or between 0 wt. % and 25 wt. % copper or contains between 0 wt. % and 40 wt. % antimony and between 0 wt. % and 25 wt. % copper.

10. The sliding bearing element as claimed in claim 1, wherein the tin-based alloy of the at least on additional layer contains
between 0 wt. % and 3 wt. % copper or antimony or copper and antimony and between 0.01 wt. % and 10 wt. % bismuth or lead or bismuth and lead.

11. The sliding bearing element as claimed in claim 1, wherein the at least one additional layer has only one grain layer of beta-tin grains.

12. The sliding bearing element as claimed in claim 1, wherein the beta tin grains in the at least one additional layer have an average grain size of between 10% and 90% of the layer thickness of the at least one additional layer.

13. The sliding bearing element as claimed in claim 1, wherein the at least one additional layer is deposited galvanically.

14. The sliding bearing element as claimed in claim 1, wherein the at least one additional layer is arranged directly on the at least one running layer.

15. The sliding bearing element as claimed in claim 1, wherein at least one bearing metal layer is arranged between the support element and the at least one running layer.

* * * * *